(12) United States Patent
Ukai et al.

(10) Patent No.: US 8,672,551 B2
(45) Date of Patent: Mar. 18, 2014

(54) SLIDING BEARING FOR INTERNAL COMBUSTION ENGINES

(75) Inventors: Tomohiro Ukai, Inuyama (JP); Osamu Ishigo, Inuyama (JP); Yoshihiro Ozawa, Inuyama (JP)

(73) Assignee: Daido Metal Company, Ltd., Naka-Ku, Nagoya (JP)

( * ) Notice: Subject to any disclaimer, the term of this patent is extended or adjusted under 35 U.S.C. 154(b) by 141 days.

(21) Appl. No.: 13/076,777

(22) Filed: Mar. 31, 2011

(65) Prior Publication Data

US 2011/0243486 A1  Oct. 6, 2011

(30) Foreign Application Priority Data

Mar. 31, 2010 (JP) ................................. 2010-082418

(51) Int. Cl.
*F16C 33/10* (2006.01)

(52) U.S. Cl.
USPC .......................................................... 384/288

(58) Field of Classification Search
USPC .................. 384/283, 286, 288, 290, 294, 429
See application file for complete search history.

(56) References Cited

U.S. PATENT DOCUMENTS

| | | | | |
|---|---|---|---|---|
| 1,948,340 A | * | 2/1934 | Dolza et al. ...................... | 184/6.5 |
| 2,822,222 A | * | 2/1958 | Prince ............................. | 384/288 |
| 3,311,428 A | * | 3/1967 | Scheufler ........................ | 384/286 |
| 4,567,815 A | * | 2/1986 | Kocher ............................ | 92/261 |
| 5,009,522 A | | 4/1991 | Hahn | |
| 6,176,621 B1 | * | 1/2001 | Naitoh et al. .................. | 384/291 |
| 2005/0047689 A1 | * | 3/2005 | Yamazaki et al. ............ | 384/288 |
| 2008/0187259 A1 | | 8/2008 | Ishigo et al. | |
| 2009/0169141 A1 | | 7/2009 | Ishigo et al. | |

FOREIGN PATENT DOCUMENTS

| | | |
|---|---|---|
| JP | 4-219521 A | 8/1992 |
| JP | 8-277831 A | 10/1996 |
| JP | 2005-69283 A | 3/2005 |
| JP | 2008082355 A | 4/2008 |
| JP | 2009174697 A | 8/2009 |

* cited by examiner

*Primary Examiner* — James Pilkington
*Assistant Examiner* — Richard Urbanski
(74) *Attorney, Agent, or Firm* — Browdy and Neimark, PLLC (57) ABSTRACT

A sliding bearing supporting a crankshaft journal portion of an internal combustion engine includes a semi-cylindrical bearing half provided with a circumferential oil groove on its inner surface. The circumferential oil groove has an open groove end at least at one of its two circumferential ends, one end being in the rotational direction of the crankshaft. The other cylindrical bearing half has at least one circumferential local groove on its inner circumferential surface with an open groove end at a second circumferential end directed in the opposite direction to the relative rotational direction of the crankshaft. The circumferential oil groove and the local circumferential groove are in fluid communication at a region where groove bottom of the local circumferential groove deviates toward the sliding bearing from another groove bottom of the circumferential groove. An axial groove is formed along a contact interface between the first and second circumferential ends.

4 Claims, 6 Drawing Sheets

FLOW OF LUBRICANT OIL
IN OIL GROOVE

SLIDING BEARING FOR INTERNAL COMBUSTION ENGINES

CROSS-REFERENCE TO RELATED APPLICATIONS

The present application claims priority from JP Patent Application Ser. No. JP-2010-82418 filed on Mar. 31, 2010, the content of which is hereby incorporated by reference into this application.

TECHNICAL FIELD

The present invention relates to a sliding bearing for supporting a crankshaft journal portion of an internal combustion engine, which is a cylindrical body formed from a combination of a pair of semi-cylindrical bearings.

BACKGROUND ART

A conventional sliding bearing for supporting a crankshaft journal portion has been used as a cylindrical body formed by combining two semi-cylindrical bearings. In the sliding bearing, a circumferential oil groove is formed on an inner circumferential surface of at least one of the pair of semi-cylindrical bearings, through which circumferential oil groove oil is fed to an outer circumferential surface of a crankpin. In general, the circumferential oil groove has been made to have a constant depth (see JP-A-08-277831).

On the other hand, recently there has been made a proposal to form a narrow part where a sectional area of the oil groove is reduced from a bearing circumferential center part toward a bearing circumferential end part in order to decrease leakage of lubricant oil from the bearing circumferential end part in order to cope with a trend of size reduction of an oil pump for feeding lubricant oil (see JP-A-04-219521 and JP-A-2005-69283).

BRIEF SUMMARY OF THE INVENTION

With regard to a lubricant oil supply to a sliding bearing for internal combustion engines, the lubricant oil is first fed from outside the sliding bearing for a crankshaft journal portion into a circumferential oil groove formed on an inner surface of the sliding bearing, and further fed to a sliding surface of the sliding bearing for the crankshaft journal portion and a sliding surface of a sliding bearing for a crankpin.

When running in an internal combustion engine, foreign substances being remained in a lubricant oil passage is liable to be contained in lubricant oil fed into the circumferential oil groove of the sliding bearing for the crankshaft journal portion. The foreign substances are pieces of material generated when the oil passage is formed by machining, molding sand used in casting process, and so on. The foreign substances are accompanied by a lubricant oil flow when a crankshaft rotates. In a conventional sliding bearing for internal combustion engines, the foreign substances are discharged with the lubricant oil through a clearance such as crush relieves and chamfers formed in circumferential end regions of the semi-cylindrical bearings. In a recent internal combustion engine, however, since a crankshaft is caused to rotate at a higher speed as a trend, and an inertia (under which the foreign substances are caused to move ahead) applied to the foreign substances becomes greater, the foreign substances are not discharged through clearances existing in circumferential end regions of the pair of semi-cylindrical bearings but move to a sliding surface zone of the other sliding bearing (i.e. the other semi-cylindrical bearing) having no circumferential oil groove, so that the sliding surface of the sliding bearing is liable to suffer damages due to the foreign substances.

On the other hand, in order to reduce a leakage of the lubricant oil through the circumferential end regions of the sliding bearing, there has been proposed a sliding bearing consisting of a pair of semi-cylindrical bearings in which circumferential end regions a narrow part is formed in a circumferential oil groove (see JP-A-04-219521 and JP-A-2005-69283). Studying such sliding bearings in viewpoint of the foreign substances, there is a problem that a flow rate of the lubricant oil increases on the downstream side from the narrow part in a flow direction of the lubricant oil, and a greater inertia is thereby applied to the foreign substances accompanied by the lubricant oil, thereby the foreign substances are more liable to move to the sliding surface zone of the other semi-cylindrical bearing.

In order to solve the problem, there has been a proposal to form crush relieves in circumferential end regions of a pair of semi-cylindrical bearings so as to be in communication with a circumferential oil groove thereby making an area of a clearance between a crush relief surface and a crankshaft surface relatively larger than a cross-sectional area of a circumferential oil groove at a circumferential end of a semi-cylindrical bearing (see JP-A-2005-69283). The bearing has a problem that a much more oil leaks outside through a width-wise end of the bearing from the clearance between the crush relief surface and the crankshaft surface, and an amount of oil, which is fed to an inner circumferential surface of the mating semi-cylindrical bearing located on the downstream side from the circumferential oil groove, is reduced, thereby decreasing lubricity in the mating semi-cylindrical bearing.

Accordingly, an object of the present invention is to provide a sliding bearing for internal combustion engines, which is excellent in foreign substances discharge property and lubricity.

Under the above object, there is provided a sliding bearing for supporting a crankshaft journal portion of an internal combustion engine, which is a cylindrical body formed from a combination of a pair of semi-cylindrical bearings, wherein one of the semi-cylindrical bearings is provided with a circumferential oil groove on its inner circumferential surface, and has two circumferential ends, the circumferential oil groove having an open groove end at least one of the two circumferential ends, which one is a first circumferential end being directed to the same direction as a relative rotational direction of a crankshaft, wherein the other semi-cylindrical bearing is provided with at least one circumferential local groove on its inner circumferential surface, and has two circumferential ends, the circumferential local groove having an open groove end at one of the two circumferential ends, which one is a second circumferential end being directed to the opposite direction to the relative rotational direction of the crankshaft, wherein width centers of the circumferential oil groove and the local circumferential groove are in alignment with each other thereby making the circumferential oil groove and the local circumferential groove to be in fluid communication with each other, and at a region of the fluid communication, a groove bottom of the local circumferential groove is deviated toward an axis of the sliding bearing from another groove bottom of the circumferential oil groove, and wherein along a contact interface between the first and second circumferential ends, at least one of two inner side corner edges of the first and second circumferential ends is chamfered to have an inclined face thereby forming an axial groove throughout an entire axial width of the sliding bearing, which axial groove is in fluid communication with the circumferential oil groove.

According to one preferred embodiment of the present invention, the circumferential local groove is formed within a range of a circumferential angle (θ) measured from the second circumferential end, which angle range is at least 5° and at maximum 45°.

According to another embodiment of the present invention, a groove width (W1) of the circumferential oil groove is larger than a groove width (W2) of the circumferential local groove in the fluid communication region. A preferable relationship between the groove width (W1) and the groove width (W2) is expressed by an equation W2=(0.50 to 0.90)×W1.

According to another embodiment of the present invention, a groove depth (D1) of the circumferential oil groove and a groove depth (D2) of the circumferential local groove satisfy an equation D2=(0.50 to 0.90)×D1 in the fluid communication region.

(1) In the invention, the circumferential oil groove and the circumferential local groove are in fluid communication with each other with the groove width centers of the circumferential oil groove and the circumferential local groove being in alignment with each other. In the fluid communication region, the groove bottom of the circumferential local groove is deviated toward the axis of the sliding bearing from the groove bottom of the circumferential oil groove. In this structure, a partial open section close to the groove bottom surface side as a part of the open groove end of the circumferential oil groove located at the two circumferential ends being in contact with each other is closed by the circumferential end of the semi-cylindrical bearing having the circumferential local groove. Therefore, the partially closed structure of the open groove end works as a barrier to foreign substances moving along the groove bottom of the circumferential oil groove to the open groove end and having a larger specific gravity than lubricant oil, so that a circumferentially moving speed of the foreign substances are decelerated and a translatory inertia force of the foreign substances is reduced.

On the other hand, along a contact interface between the first and second circumferential ends, at least one of two inner side corner edges of the first and second circumferential ends is chamfered to have an inclined face thereby forming an axial groove throughout an entire axial width of the sliding bearing. According to such a structure, the foreign substances, of which circumferential moving speed has been caused to be decelerated, is liable to be entrained in lubricant oil flowing through the circumferential oil groove and the axial groove in fluid communication with each other, thereby the foreign substances is smoothly discharged outside together with the lubricant oil from axial ends of the sliding bearing.

With regard to the axial groove, if it is made to have an excessive cross-sectional area, a leakage of the lubricant oil increases, so that preferably a cross-sectional area of the axial groove is made as small as possible insofar as the foreign substances can be discharged outside. More specifically, the groove width of the axial groove is preferably 0.2 to 1 mm, and the groove depth thereof is preferably 0.2 to 1 mm in a case of a small internal combustion engine mounted on a passenger automobile or the like. It is noted that the size of the width or depth of the circumferential oil groove is determined by the specifications of each internal combustion engine, and there is no limit on the circumferential oil groove as long as the relationship with the circumferential local groove defined in the invention is obtained.

(2) Lubricant oil mainly flowing through the circumferential oil groove during rotation of the crankshaft relative to the sliding bearing is accompanied by foreign substances. Foreign substances having a larger specific gravity than the lubricant oil move along the groove bottom by the action of a centrifugal force while the foreign substances are moving inside the circumferential oil groove. Thus, lubricant oil flowing through an upper region of the circumferential oil groove (i.e. the upper region closer to the crankshaft, not a lower region closer to the groove bottom) has a small amount of foreign substances. The lubricant oil with a small amount of foreign substances flowing through the upper region of the circumferential oil groove smoothly flows into the circumferential local groove in fluid communication with the circumferential oil groove, and spreads over the inner circumferential surface of the other side semi-cylindrical bearing having the circumferential local groove, which surface is brought into sliding contact with the crankshaft. Accordingly, good lubricity is obtained at the other side semi-cylindrical bearing. The above description applies to a case in which the groove depth (D1) of the circumferential oil groove and the groove depth (D2) of the circumferential local groove satisfy the relationship of D1>D2. In a case of D1≤D2, the foreign substances moving along the groove bottom surface of the circumferential oil groove easily enter the circumferential local groove to be fed to the inner circumferential surface of the other side semi-cylindrical bearing. Even when D1>D2, the foreign substances reaching the open groove end of the circumferential oil groove easily enter the circumferential local groove of the other side semi-cylindrical bearing to be fed to the inner circumferential surface of the other side semi-cylindrical bearing when there is no axial groove in fluid communication with the circumferential oil groove unlike the sliding bearing according to the invention.

(3) In the sliding bearing according to the invention, the partial open section close to the groove bottom surface as a part of the open groove end of the circumferential oil groove is closed by the circumferential end of the semi-cylindrical bearing having the circumferential local groove in the fluid communication region between the circumferential oil groove and the circumferential local groove. The structure exerts a blocking effect on the foreign substances moving along the groove bottom of the circumferential oil groove to the open groove end. To maximize the blocking effect, the groove bottom preferably has a flat surface such that the circumferential oil groove and the circumferential local groove have a sufficiently large groove bottom width.

(4) Here is provided a description of a preferred embodiment in which the circumferential local groove is formed within the range of the circumferential angle (θ) measured from the second circumferential end, which angle range is at least 5° and at maximum 45°. When the circumferential angle range θ is not less than 5°, lubricity on the inner circumferential surface of the semi-cylindrical bearing having the circumferential local groove can be improved because of an ensured sufficient oil supply to the inner circumferential surface of the semi-cylindrical bearing. When the circumferential angle range θ is less than 5°, a sufficient oil supply cannot be obtained. The reason why the maximum value of the circumferential angle range θ is 45° is that it is needed to avoid forming the circumferential local groove on a main load receiving region of the semi-cylindrical bearing having the circumferential local groove (i.e. a circumferential center region of the semi-cylindrical bearing to which a large load is applied from the crankshaft), thereby ensuring strength of the semi-cylindrical bearing against a large load acting thereon.

(5) The reason why the structure in which the groove depth (D1) of the circumferential oil groove and the groove depth (D2) of the circumferential local groove satisfy the relational expression D2=(0.50 to 0.90)×D1 in the fluid communication region is employed as a preferred aspect of the invention is described. In order to reduce the speed of the foreign substances moving along the groove bottom of the circumferential oil groove to the position of the fluid communication region, it is preferable that the groove depth (D2) of the circumferential local groove is set to 90% or less of the groove depth (D1) of the circumferential oil groove, so that 10% or more of the groove depth of the circumferential oil groove is closed by the circumferential end of the other semi-cylindrical bearing having the circumferential local groove. Meanwhile, in order to ensure a sufficient supply of lubricant oil to the inner circumferential surface of the other side semi-cylindrical bearing on the downstream side from the circumferential oil groove, it is preferable that the groove depth (D2) of the circumferential local groove is set to 50% or more of the groove depth (D1) of the circumferential oil groove, and 50% or more of the groove depth (D1) of the circumferential oil groove is open to the groove depth (D2) of the circumferential local groove in the fluid communication region. Please note that the size of the width or depth of the circumferential oil groove is determined by the specifications of each internal combustion engine, and there is no limit on the size of the width or depth of the circumferential oil groove as long as the relationship with the circumferential local groove defined in the invention is obtained.

DETAILED DESCRIPTION OF THE INVENTION

Embodiment 1

Figure 1:
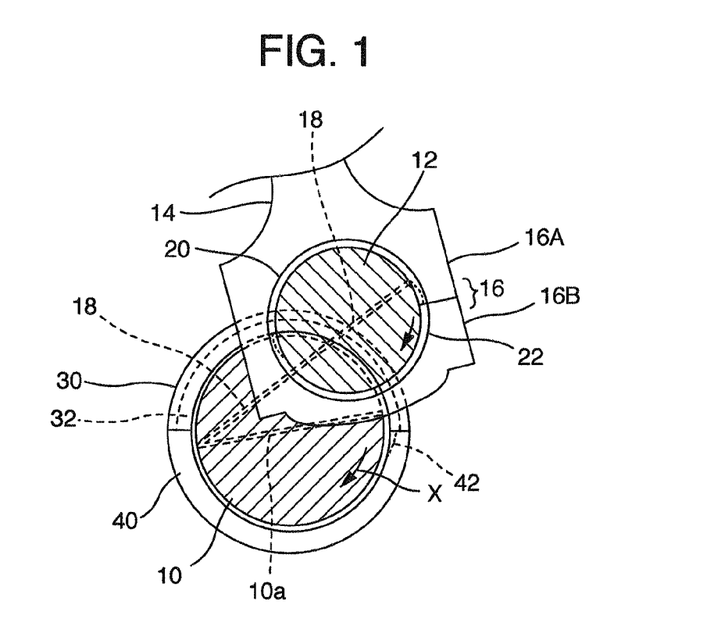
FIG. 1 is a schematic view of a crankshaft of an internal combustion engine in which a journal portion and a crankpin portion are shown in section.

FIG. 1 is a schematic view illustrating a crankshaft of an internal combustion engine respectively cut along a journal portion and a crankpin portion. A crank journal 10, a crankpin 12, and a connecting rod 14 are shown therein. The three members are in such a positional relationship in the depth direction of the figure that the journal 10 is farthest from the front, and the crankpin 12 is on the near side and is surrounded by a big end housing 16 of the connecting rod 14 that carries a piston on the other end.

The crank journal 10 is supported on a lower portion of a cylinder block of the internal combustion engine via a cylindrical sliding bearing including an upper semi-cylindrical bearing 30 and a lower semi-cylindrical bearing 40. A circumferential oil groove 32 is formed over the entire length of an inner circumferential surface of the upper semi-cylindrical bearing 30 located on the upper side of the drawing.

The crank journal 10 also has a diametrical through hole 10a. When the crank journal 10 rotates in the direction of an arrow X, both end openings of the through hole 10a alternately communicate with the circumferential oil groove 32.

A lubricant oil passage 18 is also formed inside the crankshaft through the crank journal 10, a crank arm (not shown), and the crankpin 12.

The crankpin 12 is held in the big end housing 16 (including a connecting rod side big end housing 16A and a cap side big end housing 16B) of the connecting rod 14 via a pair of semi-cylindrical bearings 20 and 22. The semi-cylindrical bearings 20 and 22 are assembled by abutting butt end surfaces thereof against each other to be formed into a cylindrical connecting rod bearing.

During operation of the engine, lubricant oil is fed from an oil gallery provided in the cylinder block into the circumferential oil groove 32 through an opening formed passing through the wall of the upper semi-cylindrical bearing 30 where the circumferential oil groove 32 is formed in the inner circumferential surface, out of the upper semi-cylindrical bearing 30 and the lower semi-cylindrical bearing 40 constituting the main bearing that supports the crank journal 10. The both end openings of the diametrical through hole 10a formed in the rotating crank journal 10 intermittently communicate with the circumferential oil groove 32. At the time of communication, a lubricant oil pressure is applied into the through hole 10a, and a lubricant oil supply pressure is further applied into the lubricant oil passage 18 in communication with the through hole 10a. Accordingly, the lubricant oil is fed to a sliding surface portion between the crankpin 12 and the connecting rod bearings 20 and 22 from an outlet (an opening) of the lubricant oil passage 18 provided on an outer circumferential surface of the crankpin 12.

Figure 2:
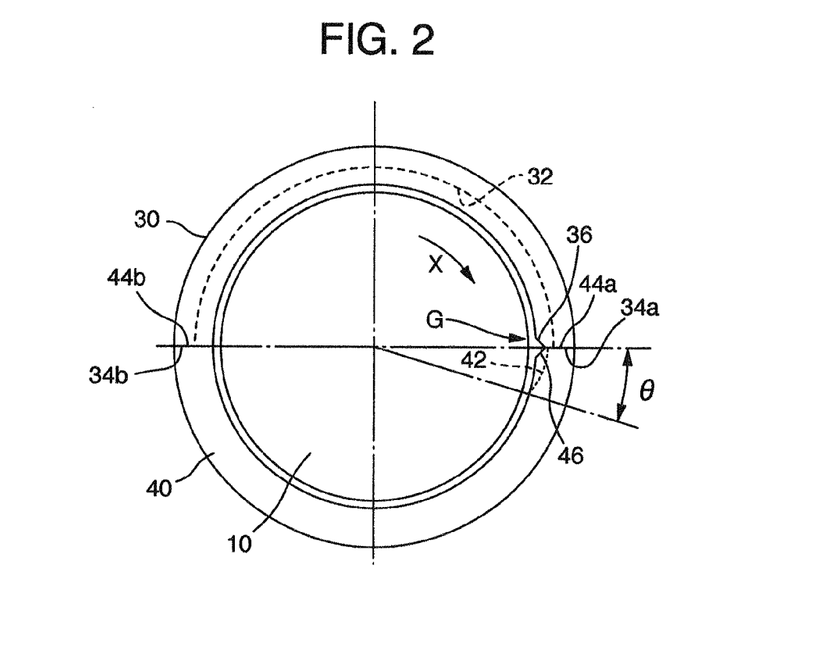
FIG. 2 is a front view of a sliding bearing for a crank journal according to a first embodiment of the present invention.
Figure 3:
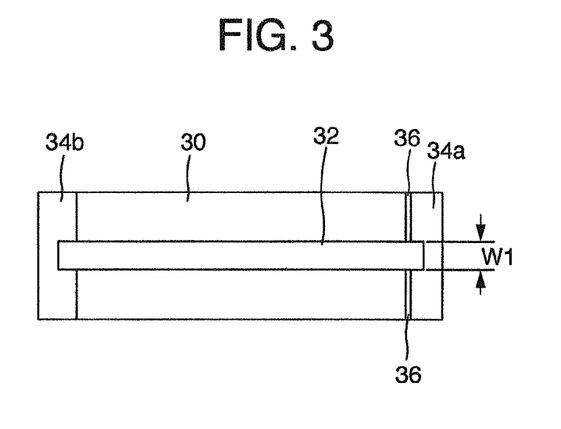
FIG. 3 is a plan view of an inner circumferential surface of a semi-cylindrical bearing as a half body of the sliding bearing shown in FIG. 2.
Figure 4:
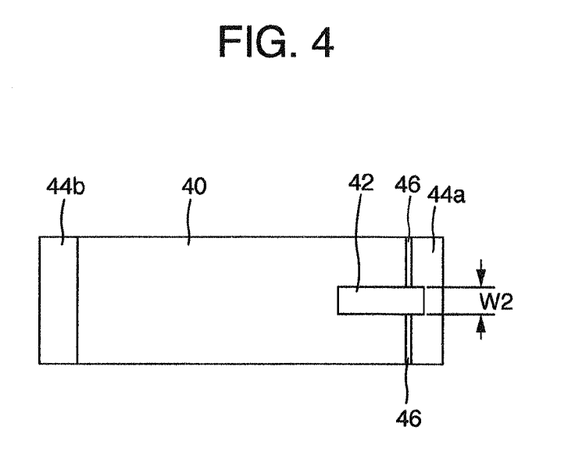
FIG. 4 is a plan view of an inner circumferential surface of a semi-cylindrical bearing as the other half body of the sliding bearing shown in FIG. 2.
Figure 5:
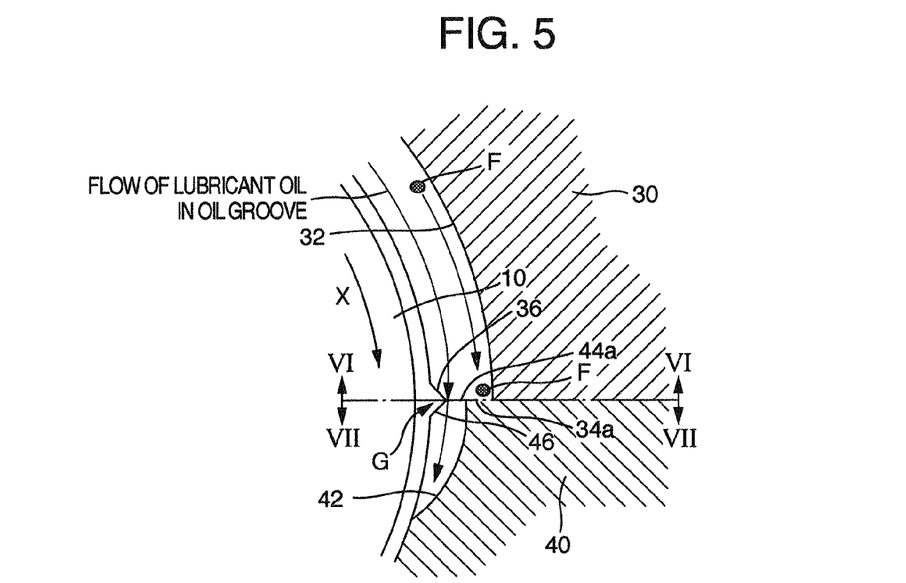
FIG. 5 is an illustration of a function of the sliding bearing shown in FIG. 2.

FIGS. 2 to 4 show the cylindrical sliding bearing for the crank journal 10 including the upper semi-cylindrical bearing 30 and the lower semi-cylindrical bearing 40. In the two bearings 30 and 40, circumferential ends 34a and 34b, and 44a and 44b are respectively abut against each other.

Figure 6:
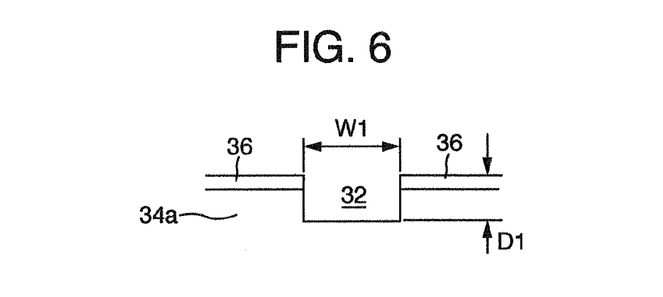
FIG. 6 is a view showing a circumferential end of the semi-cylindrical bearing as the half body of the sliding bearing shown in FIGS. 2 to 4 (i.e. a view indicated by an arrow line VI-VI in FIG. 5)

The circumferential oil groove 32 is circumferentially formed in the entire upper semi-cylindrical bearing 30 from the circumferential end 34a to 34b. Accordingly, the circumferential oil groove 32 has open groove ends at the circumferential ends 34a and 34b. The circumferential oil groove 32 has a flat groove bottom as shown in FIG. 6.

An edge portion located on the inner side (the axis side of the sliding bearing) of the circumferential end 34a oriented in the same direction as the crankshaft rotation direction (see the arrow X) is chamfered over the entire bearing width to form an inclined surface 36.

Figure 7:
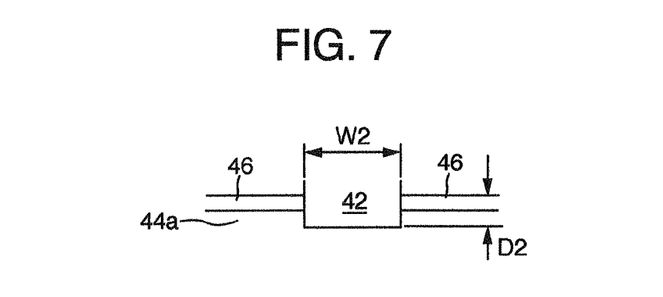
FIG. 7 is a view illustrating a circumferential end of the semi-cylindrical bearing as the other half body of the sliding bearing shown in FIGS. 2 to 4 (i.e. a view indicated by an arrow line VII-VII in FIG. 5)

A circumferential local groove 42 having a small circumferential length is formed in an inner circumferential surface of the lower semi-cylindrical bearing 40 within a range of a circumferential angle θ measured from the circumferential end 44a. The center of the groove width of the circumferential local groove 42 and the center of the groove width of the circumferential oil groove 32 are aligned with each other at the circumferential ends 34a and 44a abut against each other. The circumferential local groove 42 has a flat groove bottom as shown in FIG. 7.

An edge portion located on the inner side (the axis side of the sliding bearing) of the circumferential end 44a oriented in the opposite direction to the crankshaft rotation direction (see the arrow X) is chamfered over the entire bearing width to form an inclined surface 46.

The inclined surface 46 is paired with the inclined surface 36, to define an axial groove G of V section extending over the entire axial width of the sliding bearing.

With the aforementioned configuration, the circumferential oil groove 32 and the circumferential local groove 42 are in fluid communication with each other at the circumferential ends 34a and 44a in contact with each other. The two grooves 32 and 42, and the axial groove G are also in fluid communication with each other.

Dimensional Relationship Between the Circumferential Oil Groove 32 and the Circumferential Local Groove 42

(1) Groove width of the circumferential oil groove 32 and the circumferential local groove 42: Groove widths W1 and W2 of the two grooves 32 and 42 are equal to each other (W1=W2) (see FIGS. 3 and 4).

(2) Groove depth of the circumferential oil groove 32 and the circumferential local groove 42: Since there exists the axial groove G at the position of the circumferential ends 34a and 44a in contact with each other, the depths of the grooves 32 and 42 at the position of the circumferential ends 34a and 44a cannot be directly defined. However, based on a virtual inner circumferential surface of the sliding bearing obtained when there is no axial groove G, a relationship of D1>D2 is set between the groove depth (D1) of the circumferential oil groove 32 and the groove depth (D2) of the circumferential local groove 42. To express the relationship of D1>D2 in another way, "the groove bottom of the circumferential local groove 42 is deviated toward the axis of the sliding bearing from the groove bottom of the circumferential oil groove 32".

With the aforementioned configuration of the upper semi-cylindrical bearing 30 and the lower semi-cylindrical bearing 40, the circumferential oil groove 32 and the circumferential local groove 42 are in a fluid communication state at the circumferential ends 34a and 44a abut against each other. Since the groove depths of the circumferential oil groove 32 and the circumferential local groove 42 are in the relationship of D1 (the groove depth of the circumferential oil groove 32)>D2 (the groove depth of the circumferential local groove 42) as described above, a part of the open groove end of the circumferential oil groove 32, that is, a partial open section close to the groove bottom is closed by the circumferential end 44a of the lower semi-cylindrical bearing 40. The moving speed of a foreign substance F moving along the groove bottom of the circumferential oil groove 32 is gradually reduced due to the blocking action as the foreign substance F approaches the circumferential end 34a. Since the translational inertial force of the foreign substance F in the circumferential direction is thereby reduced in a communication region between the circumferential oil groove 32 and the circumferential local groove 42, the foreign substance F is easily discharged to outside the sliding bearing from an axial end portion of the sliding bearing accompanying lubricant oil flowing through the axial groove G from the circumferential oil groove 32.

Meanwhile, there is a small amount of foreign substance in lubricant oil that flows in an upper region of the circumferential oil groove 32 apart from the groove bottom thereof. The lubricant oil flows to a sliding surface of the lower semi-cylindrical bearing 40 through the circumferential local groove 42 in fluid communication with the circumferential oil groove 32. Accordingly, a good lubrication effect can be obtained.

Embodiment 2

Figure 8:
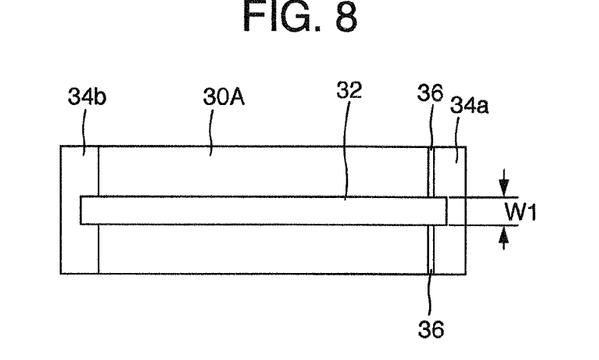
FIG. 8 is a plan view, similar to FIG. 3, of an inner circumferential surface of a semi-cylindrical bearing as a half body of a sliding bearing for a crank journal according to a second embodiment of the present invention.
Figure 9:
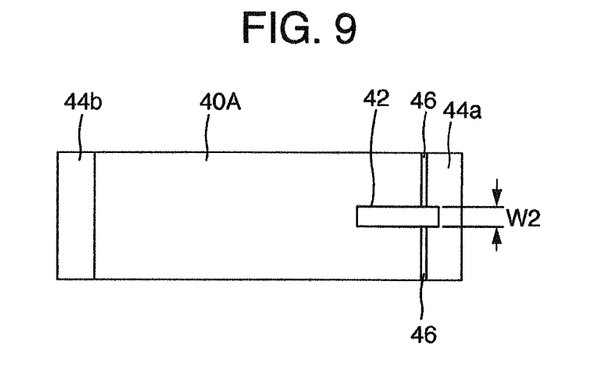
FIG. 9 is a plan view, similar to FIG. 4, of an inner circumferential surface of the other semi-cylindrical bearing paired with the semi-cylindrical bearing shown in FIG. 8.
Figure 10:
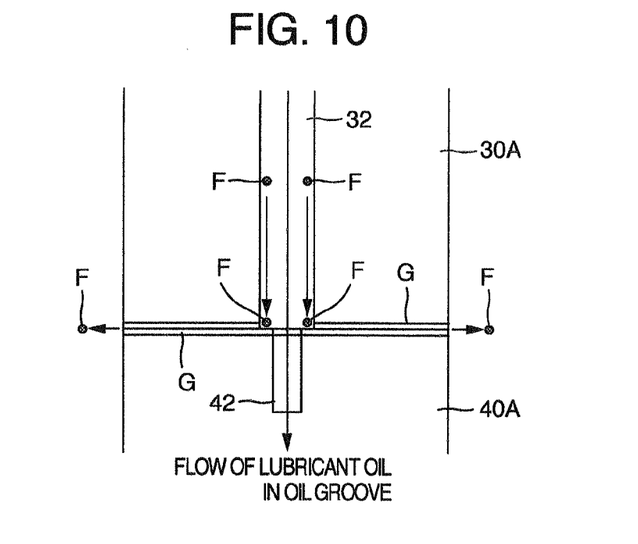
FIG. 10 is an illustration of a function of the sliding bearing shown in FIGS. 8 and 9.

A second embodiment shown in FIGS. 8 to 10 will be described. The second embodiment has the same configuration as the first embodiment except for some portions. Only differences therebetween will be described below.

The groove width (W1) of the circumferential oil groove 32 (a groove of an upper semi-cylindrical bearing 30A) and the groove width (W2) of the circumferential local groove 42 (a groove of a lower semi-cylindrical bearing 40A) satisfy a relational expression: W2<W1.

A preferable relationship between W1 and W2 is 0.50×W1<W2<0.90×W1.

The relationship of W2<0.90×W1 means that a region of 5% or more of the groove width from both the inner sides of the circumferential oil groove 32 and adjacent to the groove bottom is preferably blocked by the circumferential end 44a.

The relationship of 0.50×W1<W2 is required for ensuring a flow passage sectional area to supply a sufficient amount of lubricant oil from the circumferential oil groove 32 to the circumferential local groove 42.

With the aforementioned configuration, lubricant oil flowing through the circumferential oil groove 32 near the fluid communication region between the circumferential oil groove 32 and the circumferential local groove 42 collides with the circumferential end 44a of the lower semi-cylindrical bearing 40A particularly in the region adjacent to the groove bottom, and flows along the axial groove G toward both the axial end portions of the bearing. The foreign substance F flowing with the lubricant oil toward the circumferential end 34a along the groove bottom of the circumferential oil groove 32 accompanies the flow of the lubricant oil toward the axial groove G near the fluid communication region between the circumferential oil groove 32 and the circumferential local groove 42, collides with the circumferential end 44a when approaching the both groove side surfaces as shown in FIG. 10, and moves along the axial groove G to be discharged outside with the lubricant oil from both the axial end portions of the bearing.

In the first and second embodiments, an inclined surface similar to the inclined surface 36 may be applied to the circumferential end 34b of the upper semi-cylindrical bearings 30 and 30A to form the upper semi-cylindrical bearings 30 and 30A into a symmetrical shape. Similarly, a circumferential local groove and an inclined surface similar to the circumferential local groove 42 and the inclined surface 46 may be applied to the circumferential end 44b of the lower semi-cylindrical bearings 40 and 40A to form the lower semi-cylindrical bearings 40 and 40A into a symmetrical shape. By employing such a symmetrical shape, the sliding bearing can be prevented from being assembled in a wrong manner.

Embodiment 3

Figure 11:
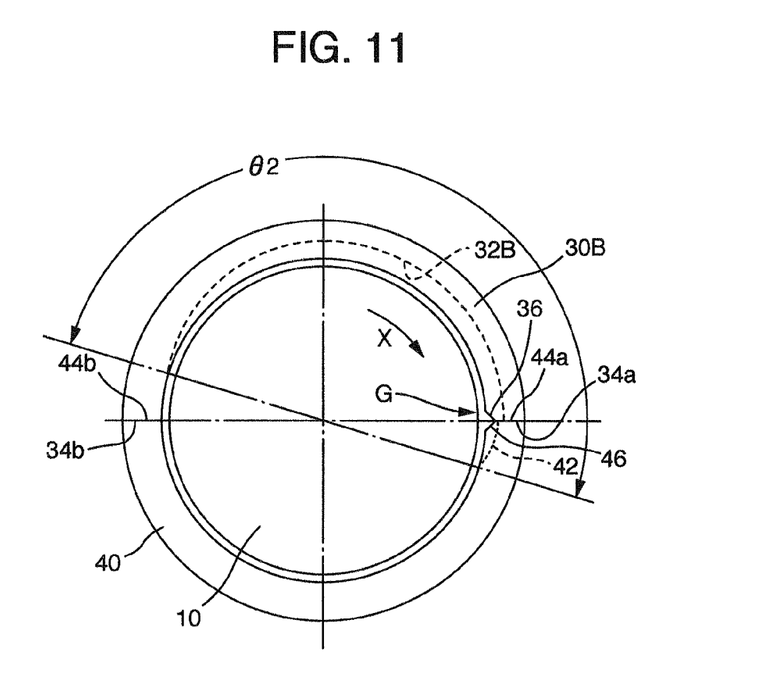
FIG. 11 is a front view of a sliding bearing for a crank journal according to a third embodiment of the present invention.
Figure 12:
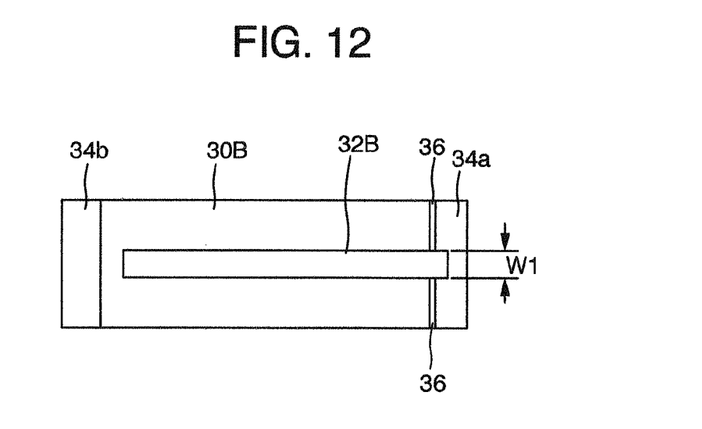
FIG. 12 is a plan view of an inner circumferential surface of a semi-cylindrical bearing as a half body of the sliding bearing shown in FIG. 11.
Figure 13:
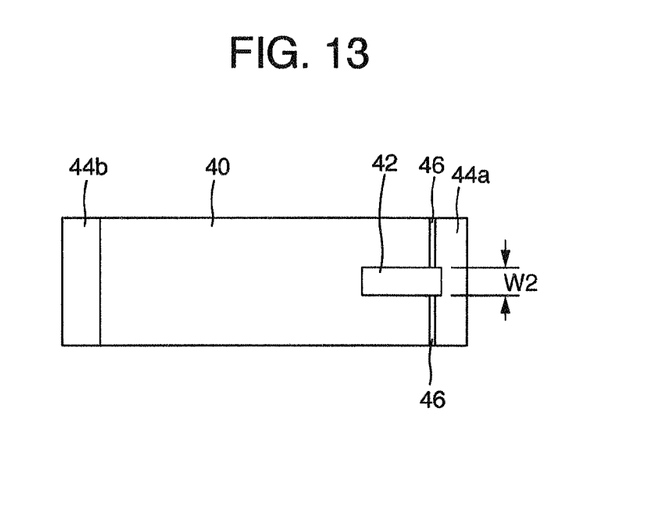
FIG. 13 is a plan view of an inner circumferential surface of a semi-cylindrical bearing as the other half body of the sliding bearing shown in FIG. 11.

A sliding bearing shown in FIGS. 11 to 13 includes an upper semi-cylindrical bearing 30B and the lower semi-cylindrical bearing 40. The lower semi-cylindrical bearing 40 is the same as the lower semi-cylindrical bearing 40 in the first embodiment. The upper semi-cylindrical bearing 30B differs from the upper semi-cylindrical bearing 30 in the first embodiment in the following point. An open groove end of a circumferential oil groove 32B is provided only at the circumferential end 34a. That is, the circumferential oil groove 32B extends from the circumferential end 34a to a position close to the circumferential end 34b, so that the open groove end is not provided at the circumferential end 34b. The sum (=a circumferential angle θ2) of a circumferential range in which the circumferential oil groove 32B of the upper semi-cylindrical bearing 30B is formed and a circumferential range in which the circumferential local groove 42 of the lower semi-cylindrical bearing 40 is formed is preferably not less than 180°. When the circumferential angle range θ2 is not less than 180°, the internal lubricant oil passage 10a formed inside the crankshaft (the crank journal 10) shown in FIG. 1 to supply lubricant oil to the crankpin always communicates with the circumferential oil groove 32B and the circumferential local groove 42. The lubricant oil is thereby stably fed to the surface of the crankpin.

The groove depth of the circumferential oil groove 32B is gradually increased from the groove end at a position close to the circumferential end 34b to the circumferential end 34a. In a similar manner to the case of the first embodiment, the groove width (W1) of the circumferential oil groove 32B is equal to the groove width (W2) of the circumferential local groove 42 (W1=W2).

Figure 14:
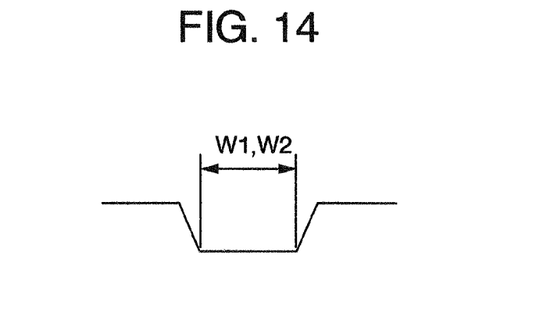
FIG. 14 is an illustration of one example of the cross-sectional shape of a circumferential oil groove and a circumferential local groove formed in the sliding bearing according to the present invention.

In the aforementioned embodiments, the cross-sectional shapes of the circumferential oil groove and the circumferential local groove may be an inverted trapezoidal shape as shown in FIG. 14, that is, the both side surfaces may be inclined to increase the width of a groove top portion relative to the groove bottom width. The groove widths (W1 and W2) of the circumferential oil groove and the circumferential local groove in this case are measured at the groove bottom.

Although the circumferential oil groove has a constant groove depth over the entire circumferential length of the upper semi-cylindrical bearing in the first and second embodiments, the sliding bearing according to the invention is not limited thereto. For example, the circumferential oil groove may be formed such that the depth thereof is gradually decreased or increased from the circumferential center portion to both the circumferential ends of the upper semi-cylindrical bearing. Alternately, the circumferential oil groove may be formed such that the groove depth is gradually decreased or increased from the circumferential end 34b to the circumferential end 34a.

Furthermore, a well-known crush relief may be formed in the bearing inner circumferential surface adjacent to each of the circumferential ends of the pair of semi-cylindrical bearings. The crush relief means a reduced-thickness region (i.e. a region with reduced thickness toward the circumferential ends, as defined in SAE J506 (see Items 3.26 and 6.4), DIN1497, §3.2) formed by removing partially the bearing wall in a region close to the circumferential ends of the pair of semi-cylindrical bearings on the inner circumferential surface side and having a different center of curvature from the center of curvature of the bearing inner circumferential surface.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sliding bearing for supporting a crankshaft journal portion of an internal combustion engine,
the sliding bearing being a cylindrical body formed from a combination of a pair of semicylindrical bearing halves having contact interfaces,
wherein one of the semi-cylindrical bearing halves is provided with a circumferential oil groove on its inner circumferential surface, and has first and second circumferential ends, the circumferential oil groove having an open groove end at least at the first circumferential end,
wherein the other semi-cylindrical bearing half is provided with a circumferential local groove on its inner circumferential surface, and has first and second circumferential ends, the circumferential local groove having an open groove end only at the second circumferential end,
wherein width centers of the circumferential oil groove and the local circumferential groove are in alignment with each other thereby making the circumferential oil groove and the local circumferential groove to be in fluid communication with each other, and at a region of the fluid communication, a groove bottom of the local circumferential groove is deviated toward an axis of the sliding bearing from a groove bottom of the circumferential oil groove,
wherein along a contact interface between the first and second circumferential ends, at least one of two inner side corner edges of the first and second circumferential ends is chamfered to have an inclined face thereby forming an axial groove throughout an entire axial width of the sliding bearing, said axial groove being in fluid communication with the circumferential oil groove,
wherein the axial groove has a width of 0.2 to 1 mm, and a depth of 0.2 to 1 mm
wherein the respective inner circumferential surfaces of the semi-cylindrical bearing halves are in alignment with each other in a radial direction thereof on inner sides of both contact interfaces between the first and second circumferential ends of the one semi-cylindrical bearing half and the second and first circumferential ends of the other semi-cylindrical bearing half, respectively, and
wherein a groove width (W1) of the circumferential oil groove is larger than a groove width (W2) of the circumferential local groove in the fluid communication region.

2. The sliding bearing according to claim 1,
wherein the circumferential local groove is formed within a range of a circumferential angle (θ) measured from the second circumferential end, said angle range is between 5° and 45°.

3. The sliding bearing according to claim 1,
wherein the groove width (W1) of the circumferential oil groove and the groove width (W2) of the circumferential local groove satisfy an equation W2=(0.50 to 0.90)×W1.

4. The sliding bearing according to claim 1,
wherein a groove depth (D1) of the circumferential oil groove and a groove depth (D2) of the circumferential local groove satisfy an equation $D2=(0.50 \text{ to } 0.90) \times D1$ in the fluid communication region.

* * * * *